United States Patent [19]
Winter et al.

[11] Patent Number: 6,030,481
[45] Date of Patent: Feb. 29, 2000

[54] METHOD AND APPARATUS FOR MANUFACTURE OF SWATCH BEARING SHEETS

[75] Inventors: Steve Winter, Highland Park; Stanley Lerner, Glencoe, both of Ill.

[73] Assignee: Color Communications, Inc., Chicago, Ill.

[21] Appl. No.: 08/967,763

[22] Filed: Nov. 10, 1997

Related U.S. Application Data

[63] Continuation of application No. 08/358,863, Dec. 19, 1994, abandoned.

[51] Int. Cl.⁷ .................................................. B32B 31/00
[52] U.S. Cl. ......................... 156/265; 156/264; 156/299; 156/517; 156/521; 156/561; 156/562
[58] Field of Search .............................. 156/63, 264, 265, 156/517, 521, 560, 561, 299, 562

[56] References Cited

U.S. PATENT DOCUMENTS

| | | |
|---|---|---|
| 2,516,783 | 7/1950 | Matter ................................ 156/557 X |
| 3,513,053 | 5/1970 | Sullivan .............................. 156/517 X |
| 4,061,521 | 12/1977 | Lerner et al. ............................ 156/265 |

FOREIGN PATENT DOCUMENTS

| | | |
|---|---|---|
| 0935078 | 10/1973 | Canada .................................. 156/521 |
| 642881 | 3/1937 | Germany .............................. 156/521 |

*Primary Examiner*—James Sells
*Attorney, Agent, or Firm*—Fitch, Even, Tabin & Flannery

[57] ABSTRACT

Color swatch charts are formed by feeding sheets eighteen inches or longer in length with this long dimension of the sheet disposed transversely to the sheet travel direction. Ribbons in a row of eighteen inches or longer are simultaneously severed with the first and last swatch in each row of identical size and with the swatches having four square corners to form a rectangular shape. This orientation of the long axis of the sheet reduces the number of stations and the length of travel of the sheets, thereby increasing production. The sheets are fed through an adhesive applying station where spots of adhesive are applied in rows to the sheet. The sheet travels through a series of swatch forming and applying stations. At each such station, a plurality of swatch ribbons are fed forwardly and severed to form the individual swatches in a row; and a row of swatches is then transferred to and adhered by the adhesive spots on the sheet. The preferred severing station comprises a rotating cylinder carrying a straight cutting blade that is resiliently backed by springs that allow the rotating cutting blade to shift radially inwardly as it sweeps past a stationary anvil blade. Thus, all of the swatches in a row are cut simultaneously rather in seriatim fashion as with a curved or helical blade. The sheets travel through a succession of stations and a succession of rows of swatches are adhered thereto.

9 Claims, 7 Drawing Sheets

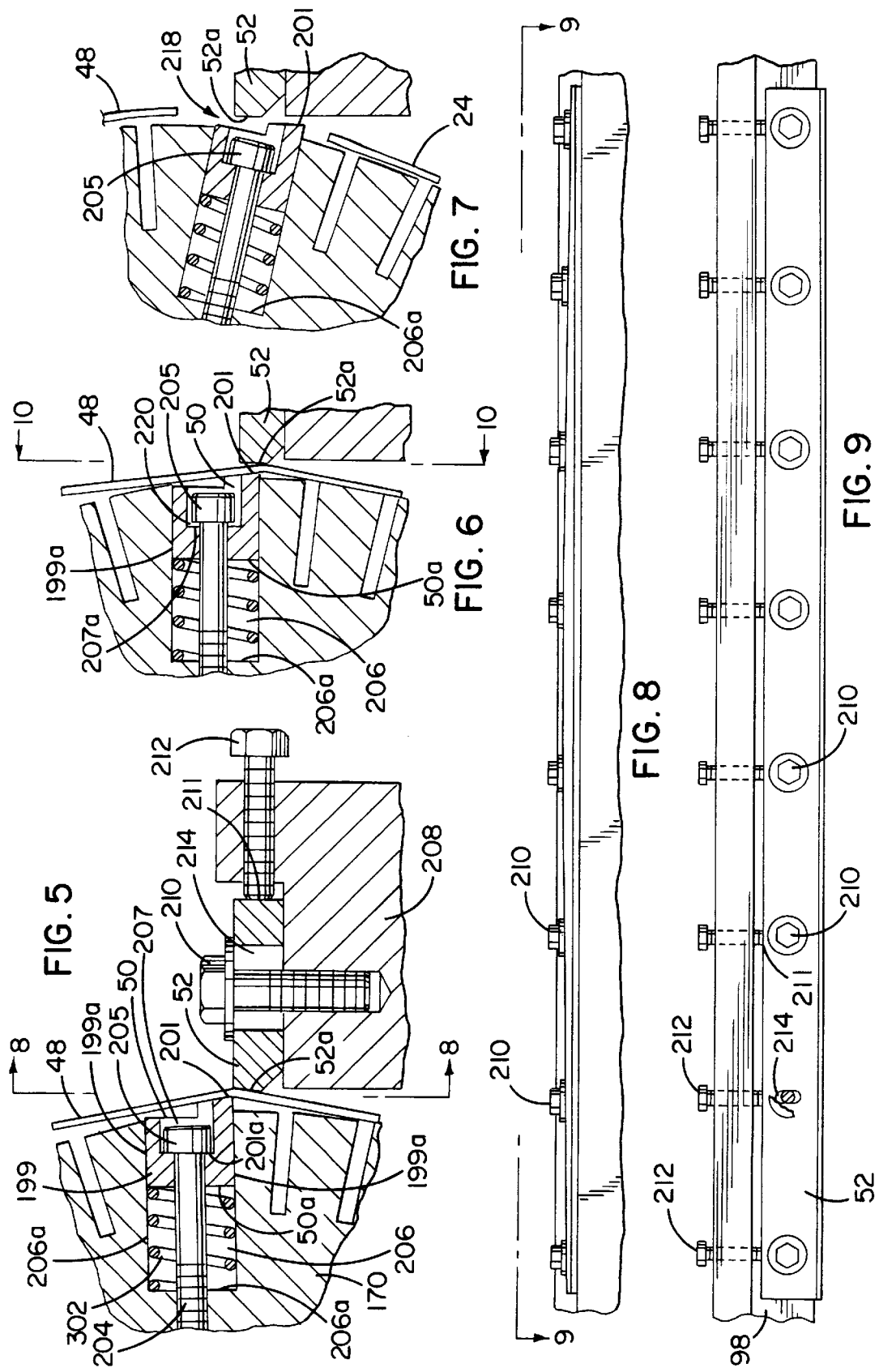

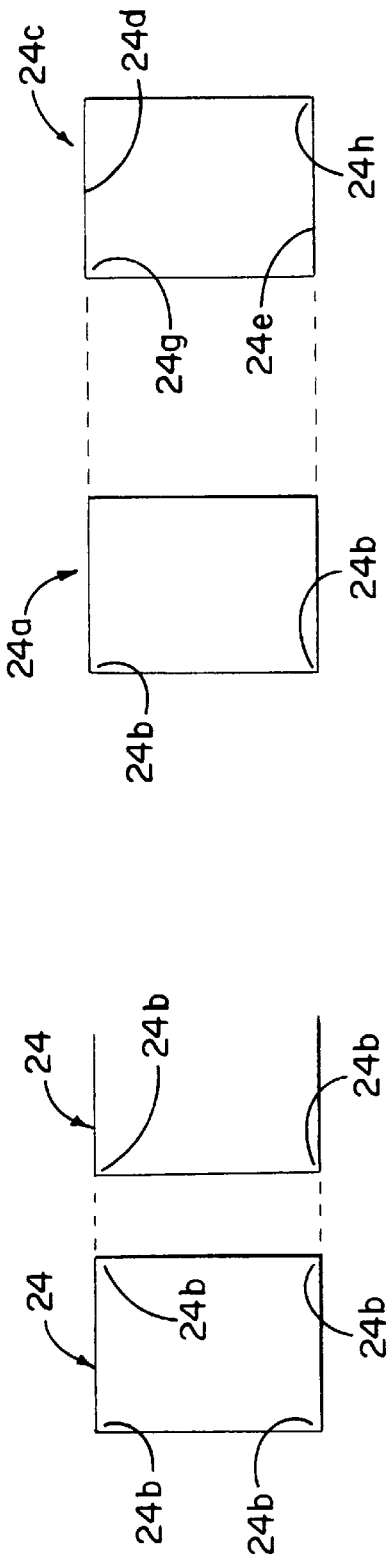
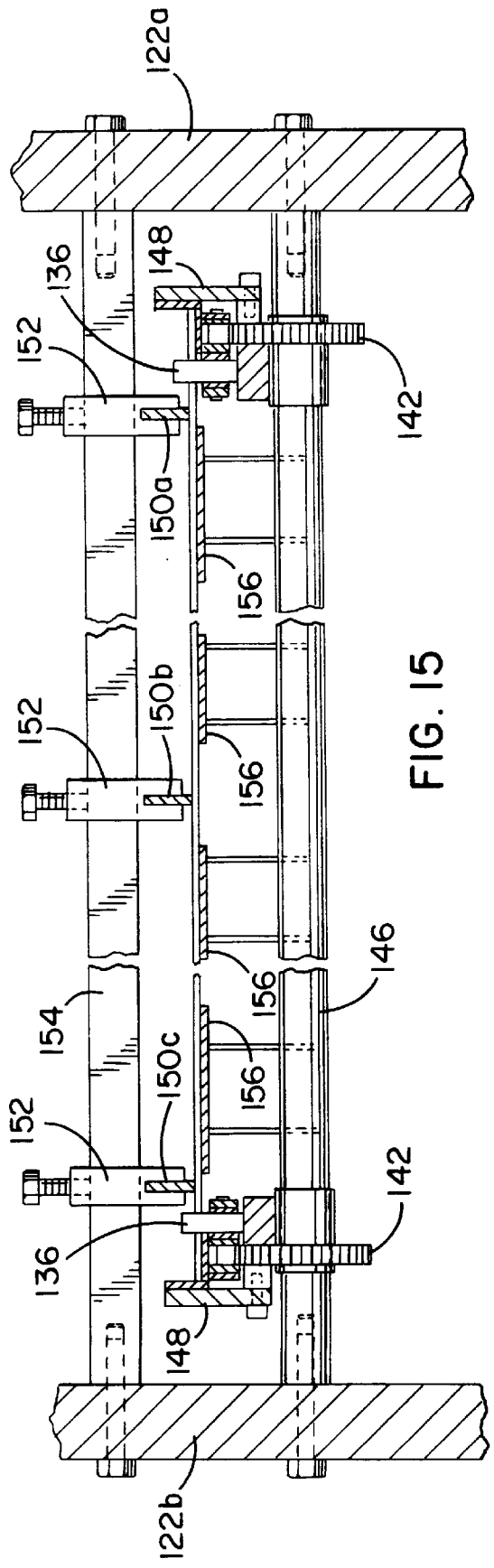
FIG. 13
FIG. 14 (PRIOR ART)
FIG. 15

METHOD AND APPARATUS FOR MANUFACTURE OF SWATCH BEARING SHEETS

This is a continuation of application Ser. No. 08/358,863, filed Dec. 19, 1994 abandoned.

BACKGROUND OF THE INVENTION

This invention relates to a method and apparatus for producing chip or swatch bearing sheets having an array of colored chips or swatches as on a color chart.

Currently, a commercial process to form such color sheets much as shown in U.S. Pat. No. 4,061,521 provides a high speed operation (e.g., 3,000 to 6,000 charts per hour) in which base sheets are fed continuously through an adhesive applying station and then through several swatch-forming and transferring stations, where color swatches are severed from reels of continuous webs or ribbons as the ribbons travel past the severing means. The severed swatches are then transferred to and deposited upon the adhesive locations on the base sheet. The trend in the color chart industry has moved toward using larger color charts (e.g., 25 to 28 inches long and 8 to 10 inches wide) as well as larger color chips. The use of larger chips corresponds to larger charts if the charts are to bear the same number of chips as before on the smaller charts. Due to a number of factors including the current cutting blade size, larger color charts must be fed through the current apparatus on the chart's long axis. When adhesive is applied to base sheets having a substantial differential in printing across the sheet surface and these sheets are fed into the current apparatus on their long axis, the base sheets often bow or buckle, causing machine jams or producing defective charts.

Another problem created by feeding charts through the apparatus on their long axis is that it necessitates longer, multi-station set-ups, some reaching over 70 feet in length for the larger color charts. These longer multi-station set-ups require more floor space, more maintenance, and more personnel to operate. Additionally, when there are not enough individual stations or available floor space, the larger color charts must be manufactured in a two-pass process, creating obvious manufacturing inefficiencies. In a two-pass process, larger charts are fed through the apparatus twice, with some of the chart's swatch rows applied in the first pass and the remaining swatch rows applied when the same chart is fed through the apparatus a second time.

With the current apparatus, each row of color swatches is applied by a separate swatch-cutting and transferring station, with a number of stations equivalent to the number of color rows linked together to produce the color chart. For example, a typical larger color chart might have eighteen rows of color chips down its long axis but only seven rows down its short axis. Feeding this chart through on its long axis would require eighteen linked stations, while feeding it through on its short axis would require only seven stations.

Fewer stations equates to an increased production rate and reduced labor and process costs. Decreasing the base sheet travel time results in a much greater hourly production rate. The base sheet's travel time through seven rather than eighteen stations can be reduced to approximately one-third of the current travel time, using the same conveyor speeds in each instance. Additionally, the reduction from eighteen to seven stations substantially eliminates the cost of eleven stations. This cost reduction is offset somewhat by the fact that the seven short-axis stations are wider than the first seven stations of the eighteen station line. However, the same number or fewer people operating the current long-axis machine may be used to operate the higher production short-axis machine, thereby providing additional production without an increase in labor costs.

The shorter travel distance also lessens manufacturing spoilage, in that there is less opportunity for the base sheets to become misaligned or distorted in the shorter travel distance. Thus, there is a need for a commercial apparatus operating at high speeds of 3,000 to 6,000 cards per hour with base sheets traveling on their short axis, thereby eliminating the problems mentioned above while improving productivity.

Although feeding the color chart through on its short axis decreases the number of individual swatch-forming and transferring stations, it necessitates longer cutting blades to accommodate the larger loads of color reels. For example, while a short-axis feed of the larger color chart described earlier would require only seven stations, each station would now be loaded with up to eighteen reels of color ribbons, instead of only seven as with the current long-axis feed. Efforts to utilize longer cutting blades of the type disclosed in the aforementioned patent have not been successful in cutting swatches at the high speeds desired, however, due to the fact that the current severing means creates non-uniform swatches. Altering the taper or using a non-tapered blade were also unsuccessful, as it was found that the non-tapered blade could not cut cleanly through the larger loads of ribbon reels.

The current severing means is comprised of a rigidly attached, cylinder-mounted blade that cuts through multiple color ribbons aligned side-by-side as they are pulled between the rotating cylinder and a stationary anvil. As the ribbons travel between the cutting blades, the tapered blades begin to cut the ribbons at one end of the ribbon stack in a scissor-like motion, continuing to cut the remainder of the ribbons as the knife cylinder turns and the cutting blades close together along a point contact across the cylinder. The actual cutting path across the cylinder is not perpendicular but somewhat helical due to the continuous turning of the knife cylinder and the scissor-like cutting motion from the tapered blades. This cutting path creates swatches which are shaped somewhat like parallelograms, and/or are different in size from one end of the ribbon stack to the other. While the discrepancy in shape or size is minor for smaller ribbon loads, it becomes more pronounced with a short-axis feed, where the blade must cut across a longer cylinder through a larger load of ribbons. Attempts to remedy this problem by altering the cutting blade taper or by using a non-tapered cutting blade were also unsuccessful, evidenced by jagged or incomplete cuts across the cylinder. A non-tapered blade contacts the ribbons simultaneously across the cylinder along a line contact rather than a point contact as with a tapered blade. Contacting the stationary anvil along a line contact creates a greater amount of force, especially across a wider expanse of cylinder. This additional force likely caused the rigidly attached cutting blade to impact, catch on the fixed anvil, and then disengage from the anvil before the cut was complete, resulting in jagged or uncut portions of ribbon across the cylinder. Thus, there is a need for an apparatus which incorporates a severing means which is able to accommodate the larger ribbon loads that accompany a short-axis feed, thereby eliminating these problems while improving productivity.

SUMMARY OF THE INVENTION

In accordance with the present invention, production may be improved and the number of stations and length of the apparatus may be substantially reduced by applying swatches to base sheets travelling on their short axis through the apparatus at the high production speeds of a commercial apparatus. Additionally, the present apparatus can accommodate the feeding of most color charts on either the long or short axis, and multiple hold-downs can be added as needed to flatten the center portions of the wider charts to minimize any bowing and misregistration that could be caused thereby. The wider swatch-applying and cutting apparatus also allows the option of processing two base sheets side-by-side if the base sheets have a narrow width, cutting the ribbons for two cards simultaneously and applying swatches to two base sheets simultaneously in each station. Thus, the present apparatus provides a quicker and double-feed capacity for smaller color charts at current high production speeds. By using the same production personnel with higher production, labor costs per card may be reduced.

In accordance with an important aspect of the invention, a row of swatch ribbons substantially larger than eighteen inches (e.g., 25 to 28 inches) may be cut simultaneously, with the cut row of swatches having an acceptable uniformity in size without an unacceptable parallelogram shape. Rather than cutting the swatches sequentially in a somewhat helical cutting path as in the aforementioned patent, the swatches are all cut simultaneously without a sticking of the cutting blade to the anvil.

This is achieved by having a severing means comprised of a spring-loaded, moving cutting blade which cooperates with a stationary anvil to cut each row of color swatches. The spring-loaded blade contacts the stationary anvil simultaneously across the whole length of the knife cylinder, retracting slightly as the blade contacts the anvil and cuts through the color ribbons in a pinching motion. The springs provide the moving cutting blade with the compliance or flexibility to retract somewhat, decreasing the force of the contact but still allowing the blade to cut smoothly through the stack of ribbons. The jarring action that was present with the previous rigidly mounted blade is eliminated, which solves the incomplete cutting problem as well as greatly extending blade life. The anvil can be adjusted to allow the spring-loaded blade to achieve the correct shear point for various thicknesses of color ribbons.

In the preferred method, there are two moving cutting blades flexibly mounted on the knife cylinder, situated 180° apart. In addition to the option of feeding two narrower charts side-by-side simultaneously as described above, the double-knife cylinder allows two shorter color charts to be fed onto the conveyor means within the spacing allocated for a longer chart. This is possible due to the fact that the knife cylinder has a large enough diameter to roll out the length of longer color charts. By utilizing two blades situated 180° apart, those shorter charts with a length such that they can pass completely under the knife drum in one-half or less of its rotation can be fed into the apparatus at a closer spacing. This option further optimizes the capacity of the knife cylinder and increases the productivity output of the apparatus.

In accordance with another important aspect of the invention, the apparatus is equipped with a vacuum-saving device which can turn the vacuum on the swatch transfer means on or off depending on whether the knife cylinder is running in single- or double-knife mode. The transfer means is a vacuum cylinder which is timed with the knife cylinder to collect and transfer the cut swatches to the base sheets as both cylinders rotate. When the knife cylinder is operating in single-knife mode, the lesser diameter transfer cylinder may complete full rotations with the vacuum operating without there being a swatch to transfer to the base sheet. The vacuum-saving device, which is comprised of a cam mounted on one axial end of the knife cylinder and a cam follower which toggles the vacuum valve off or on as the knife cylinder rotates, operates to turn the transfer cylinder vacuum off for those rotations where there will be no cut swatch to collect and transfer. Conserving the vacuum when it is not needed lessens the amount of vacuum that needs to be generated, saving costs.

In accordance with another important aspect of the invention, the vacuum feed roller which transfers the color ribbons to the severing means has drilled slots running the length of the drum to generate the desired vacuum. Removable and replaceable sheets (e.g., mylar sheets) are used to cover portions of the slots corresponding to the amount of vacuum needed for various color chip sizes. These mylar sheets are tailored to accommodate a specific color chart lay-out, allowing for quick, inexpensive set-up while maximizing the vacuum effectiveness.

Thus, it will be seen that the present invention is particularly well-suited to manufacture a variety of sizes of color charts, allowing the flexibility of feeding the larger color charts on the more optimal axis with the option of a quicker, double-capacity feed for smaller charts. The present severing means solves the problems of unequal-sized color swatches and incomplete severance of the color ribbon stack-ups. The retracting knife design also prolongs blade life as a result of decreased contact with the anvil. The ability to feed the larger color charts on their short axis equates to improved sheet control, less chip misregistration and fewer machine jams. The improved sheet control not only increases chart yield but may allow increased chart feed speed. Finally, the short axis feed requires fewer stations for each color chart, reducing floor space requirements, maintenance costs and possibly labor costs.

BRIEF DESCRIPTION OF THE DRAWINGS

FIG. 5 is a partial cross-sectional view of the rotating, cutting blade and stationary anvil blade constructed in accordance with the preferred embodiment of the invention;

FIG. 6 is a sectional view of the cutting of the ribbon by the anvil blade and the rotating, cutting blade;

FIG. 7 is a view similar to FIG. 6 after severing of the ribbon;

FIG. 8 is a side view of the anvil blade;

FIG. 9 is a view taken along line 9—9 in FIG. 8;

FIG. 13 is a diagrammatic view of end swatches from a row of swatches made with the present invention;

FIG. 14 is a diagrammatic view of end swatches in a long row of swatches made with prior art apparatus;

FIG. 15 is a diagrammatic, partially sectioned view of the whole ground mechanism and edge guides for feeding long sheets.

DESCRIPTION OF THE PREFERRED EMBODIMENT

Figures 1, 2:
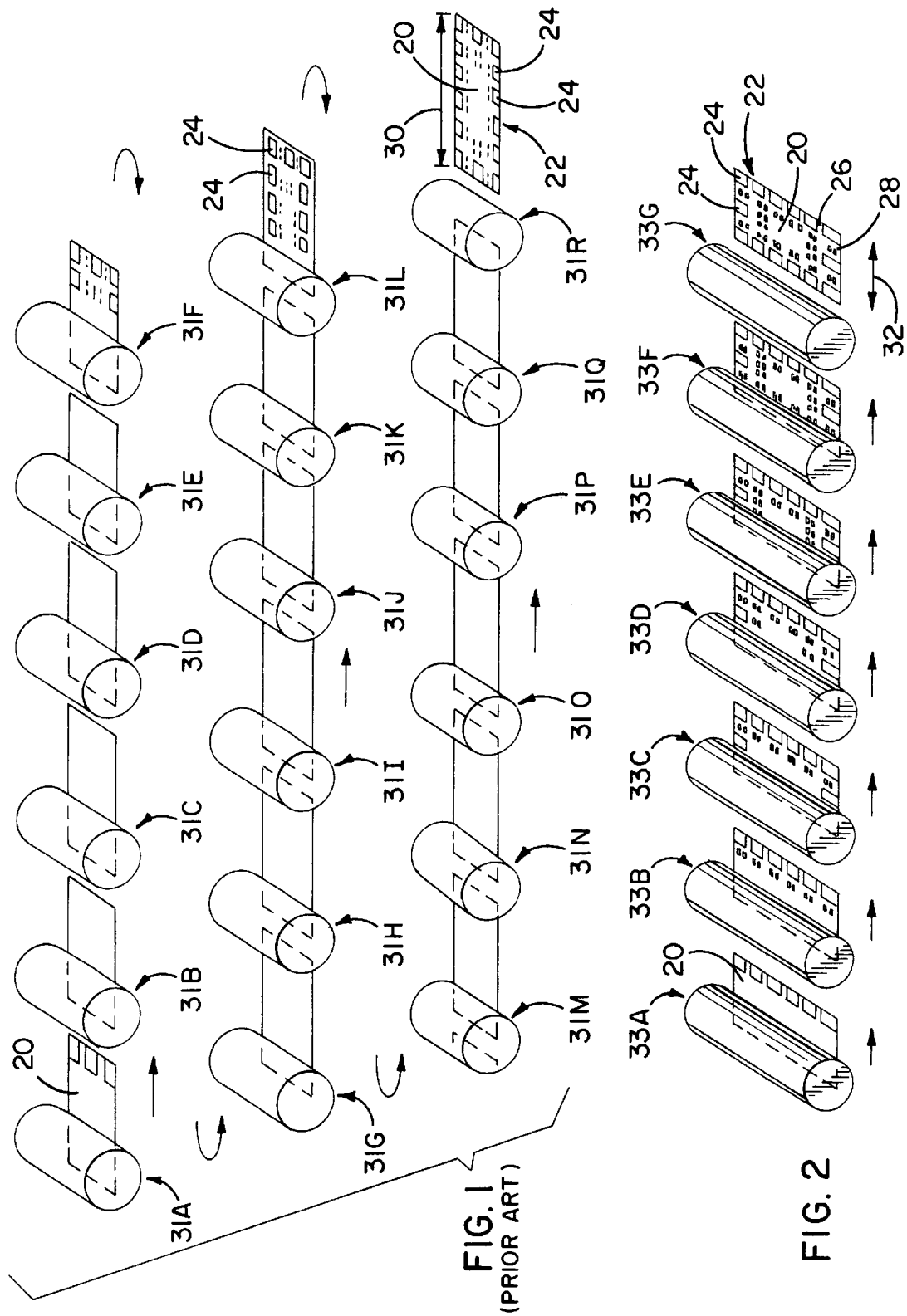
FIG. 1 is a diagrammatic view of a prior art apparatus for making a swatch bearing chart.
FIG. 2 is a diagrammatic view of an apparatus for making a swatch bearing chart and constructed in accordance with the present invention.

As shown in the drawings for purposes of illustration, the invention is embodied in a method and apparatus for producing a chip or swatch bearing chart 22 comprising a base sheet or card 20 bearing an array of various sized colored chips or swatches 24 spaced transversely of one another at predetermined intervals 26 and spaced from an adjacent row of swatches by longitudinal spaces 28 on the sheet or card. Herein, the illustrated color chart 22 will have at least eighteen rows of swatches along the long axis 30 of the card (six rows of larger swatches and twelve rows of smaller swatches). By way of example, the color card will be described as having seven rows along the short axis 32 of the card (three rows of larger swatches and four rows of smaller swatches). It is not possible in the drawings to show a matrix of e.g., 50 or more swatches on a single card so that the color card drawings shown in FIGS. 1 and 2 are illustrated with a lesser number of swatches thereon. The size of the swatches 24 may vary significantly from row to row, as indicated by the rows of swatches shown on the color charts 22 in FIGS. 1 and 2. Each swatch 24 is applied adjacent to a preprinted indicia identifying the color of the swatch, each of the swatches being of a different color. The illustrated sheet 20 is a paperboard sheet which is heavier than usual paper although paper may also be used for the base sheet 20.

In the earlier-described commercial prior art process, due to the limited width of the apparatus, a typical longer color chart had to be fed through the apparatus on its long axis 30 as illustrated in FIG. 1, necessitating the linkage of eighteen stations 31A–31R to produce the finished chart. The present invention is an improvement over the apparatus disclosed in U.S. Pat. No. 4,061,521, which is hereby incorporated by reference as if fully reproduced. In addition to requiring longer base sheet travel time, increased apparatus maintenance and higher associated costs, there were problems with sheet bowing and misalignment with the prior long-axis feed, which further lowered the apparatus yield. It was not possible using the apparatus disclosed in U.S. Pat. No. 4,061,521 because the rotating cutting blade (which is identified by the reference character 231 in that patent) was curved in a spiral-like manner to begin cutting the ribbons on one side of the cylinder, and then in a closing scissors-like action to continue to sever each of the adjacent ribbons across the transverse width of the cylinder. Thus, the first swatch 24a (FIG. 14) of a row, which were first severed, would be slightly shorter in overall length (FIG. 14) than the last swatch 24c at the other end of the row because the last cut ribbons were continuing to travel with the rotating cylinder and were formed with the pointed corners that extend their length. As best seen in FIG. 14, the first cut swatches 24a had a general rectangular shape with square corners 24b; whereas, the last cut swatches 24c had a slightly parallelogram shape with the cut edges 24d and 24e slanted to form corners 24g and 24h that were more than 90°. It was found that for substantially larger sheets, e.g., 24 or 25 inches in transverse length, that the slant of the edges 24d and 24e was very noticeable, and hence undesirable.

In accordance with the present invention, the same longer chart can be fed through the apparatus on its short axis 32 as in FIG. 2, requiring only seven stations 33A–33G to produce the same color chart while reducing the sheet travel time, the apparatus floor space and associated costs. The sheets may be over eighteen inches in length, e.g., up to 30 inches and a large number of ribbon cutting stations may be extended across the long axis of the sheet, as shown in FIG. 2; and the swatches 24 (FIG. 13) may be all cut to have four square corners of 90° in the form of rectangles with the first and last swatch in each row having the identical length. This is achieved by having each of the cutting edges of the cutting blades 50 and 52 extend straight across and parallel to the axis of the cylinder, and having all of the cuts performed simultaneously. It was found that good clean cuts could be made across the length of a card of 28 to 30 inches in the long axis dimension with the straight cutting edges by having one of the cutting edges flexibly mounted, so as to be displaceable as it moved past the other cutting edge. It was found that when both cutting edges were fixedly mounted without any displacement movement of one blade relative to the other cutting blade, the blades sometimes jammed and stuck together or caught on the ribbons and cut a ragged edge. Preferably, the rotating blade 50 on the rotating drum 170 (FIGS. 5–7) is flexibly mounted, such as by springs 202 to be displaced radially inwardly as its cutting edge sweeps past cutting edge 52a of a stationary anvil cutting blade 52. The result is cutting an entire row of cleanly cut swatches 24 (FIG. 13) each having the identical length and each having four square corners to define a rectangle shape for the swatches.

Figure 3:
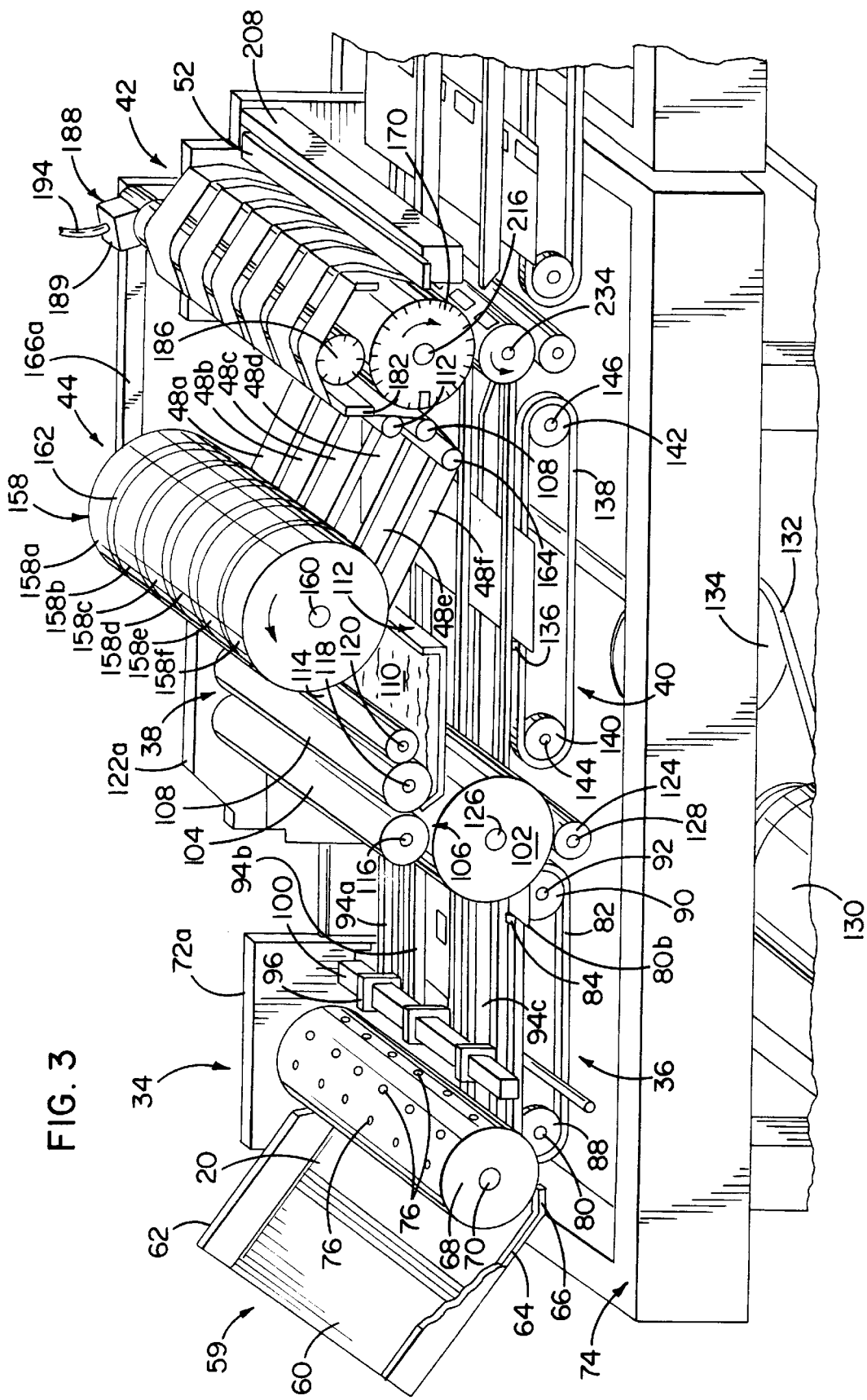
FIG. 3 is a partial view of a sheet-feeding, adhesive applying, ribbon supply and ribbon cutting station of the apparatus of FIG. 2.

In the preferred method of the present invention, a swatch-bearing chart 22 is formed in a high speed and preferably continuous manner, wherein the base sheets 20 are fed forwardly with an uninterrupted movement by a sheet feeding means 34, as shown in FIG. 3, and carried by a first conveyor means 36 to and through an adhesive applying station 38 wherein an adhesive or glue spot is applied at each of the swatch receiving locations on the sheet 20. The base sheets are then fed forwardly in timed relationship by a second conveyor means 40 to and through at least one swatch forming and applying station 42, where individual color ribbons are 1unwound from a ribbon supply means 44 and fed forwardly to a severing means 46, shown in FIG. 4. As best seen in FIGS. 5–7, predetermined lengths of the color ribbons 48 are severed as a flexibly mounted, moving cutting blade 50 contacts and retracts from a stationary anvil blade 52, pinching off a row of individual swatches 24 which are then transferred and pressed by a moving transfer means 56, shown in FIG. 4, onto the previously applied adhesive or glue spot on the base sheet, thereby adhering and affixing the swatches to the sheet 20. In these drawings, only a few of the swatch ribbons are shown, and there may be many more than the six ribbons illustrated in FIG. 3.

In FIG. 3, one swatch forming and applying station 42 is shown in detail and a second station is shown partially, but it is to be understood that a plurality of identical swatch forming and applying stations corresponding to the number of rows on the color chart are linked downstream, with each station applying a row of swatches to the sheet until the desired number of rows are applied such as the seven rows shown in FIG. 2. It is also to be understood that the present invention can accommodate the feeding of most charts on either the long or short axis, allowing the option of feeding two base sheets side-by-side if the sheets have a narrow width.

Referring now in greater detail to individual elements of the invention, the base sheets 20 are automatically fed at a high rate, e.g., 100 or more sheets per minute, from a sheet-holding or hopper means 58 (FIG. 3) in the form of an inclined tray 60 loaded with a stack of sheets 20 therein arranged in a shingle-like fashion with their lower forward edges being separated and with the top sheet being fed from the stack. The tray 60 comprises a pair of upstanding side walls 62 joined to a downwardly inclined base plate 64, which leads to another inclined guide plate section 66 extending to a position closely adjacent the periphery of a sheet feeding means 34 in the form of a rotating suction or feed roller 68.

The illustrated feed roller 68 is supported by a central shaft 70 journaled for rotation in upstanding side plates 72a of the apparatus frame means 74 and is provided along its periphery with at least one radially extending suction port 76 extending to the surface of the feed roller 68. The suction port is connected through the feed roller 68 to a suction means which allows negative pressure, i.e. suction, to be applied for a predetermined arcuate movement of feed wheel 68 as the suction port 76 is approaching and contacting the underlying top sheet 20 in the tray 60, allowing it to grip the sheet and pull it forwardly from the tray.

To assist the suction pull of the feed roller 68, it may also be provided with radially extending, compressible, resilient plugs 78 which project outwardly of the peripheral surface of the roller 68 to engage the sheet 20 and to press the same into contact with an underlying pressure roller (not shown) which is constantly driven by and secured to a rotating shaft 80 which also drives the first conveyor means 36, as will be explained in greater detail hereinafter. The peripheral wall of the underlying pressure roller is biased toward engagement with the peripheral surface of the suction feed roller 68 to establish a nip to assure a positive feed for the sheet thereto by the suction port 76.

Automatically, and with each rotation of the suction feed roller 68, one sheet 20 is fed forwardly, e.g., 100 sheets per minute when the feed roller 68 rotates at 100 rpm, at spaced and uniformly timed intervals to the first conveyor means 36 which engages and carries each sheet 20 forwardly to the adhesive station 38. Herein, the first conveyor means 36 9 comprises a pair of endless bands in the form of chains 82 each carrying outwardly projecting feed fingers 84 which on their upwardly forward run project upwardly of the chains and abut the rearward edge 20b of the sheet 20 to push the same forwardly between edge guides 148 (FIG. 15) which maintain the parallelism of the sheet as it is pushed forwardly to the adhesive applying station 38.

The endless chains 82 carrying the feed fingers 84 are each entrained about a rearward sprocket 88 fastened to the shaft 80. At their forward ends, the chains 82 are entrained about forward sprockets 90 (FIG. 3) mounted on a shaft 92 rotatably mounted in the frame means 74. The details of the construction of the conveyor means 36 will become more clear with the description of the similar second conveyor means 40, hereinafter.

A plurality of sheet hold-down guides 94a–94c also extend into the hopper means 58 and to the adhesive applying station 38 to assist in maintaining the parallelism of the succession of sheets 20 being conveyed by the first conveyor means 36. The hold-down guides 94a–94c, shown in FIG. 3, are mounted at both their forward and rearward ends by slidable brackets 96 hung on a square cross-sectioned bar 100 which spans and is fastened to the upstanding side plates 72a–72b of the apparatus frame means 74. The illustrated hold-down guides 94a–94c may be shifted along the bar 100 toward or from each other to accommodate different widths of base sheets 20. Herein, the hold-down guides at the forward ends have arcuate upturned ends which extend into the feed tray 60 to assure the sheets are aligned in the tray and remain aligned as they are fed forwardly onto the first conveyor means 36.

As best seen in FIG. 3, adhesive is applied at the adhesive applying station 38 to a continuously moving sheet 20 and preferably to each swatch receiving location or area on the sheet by an adhesive applying means. Also, as will be explained, the location of the adhesive spots can be easily varied to accommodate various swatch arrays and sheets 20. Alternatively, an adhesive applying station 38 may be provided immediately before each of the swatch forming and applying stations 42 to apply one row of adhesive spots.

An adhesive applying drum 102 is supported by a drum support shaft 126 rotatably mounted between a pair of side plates 122a–122b of the apparatus frame means 74. The drum 102 carries a plurality of glue or adhesive applying pads (not shown) on its outer surface with the pads projecting outwardly on the drum surface so that only the pads contact an adhesive applying roller 104, with the remainder of the drum surface being spaced from the adhesive applying roller by a spacing 106. Herein, the adhesive may be carefully metered by a three-roll applicator system which includes an adhesive pick-up roller 108 which has its lower periphery rotatably immersed in an adhesive or glue 110 in a tray-shaped glue tank or reservoir 112. A metering roller 114 squeegees and meters the amount of glue transferred from the pick-up roller and fed to the applicator roller 104.

It is preferred to mount each of the rollers 104, 108 and 114 for contacting each other and for rotation on shafts 116, 118 and 120 carried by a pair of side frame plates 122a–122b. The adhesive-applying drum 102 and the applicator roller 104 which applies the adhesive to the pads (not shown) on the drum 102 are preferably continuously rotated at a predetermined speed to have the pads contact the underlying sheet 20 at the linear speed that the sheet has been travelling on the first conveyor means 36 and through the nip between the drum 102 and an underlying adhesive pressure roller 124, which is supported by a shaft 128 rotatably mounted between the side frame plates 122a–122b. The pads and the underlying pressure applying roller 124 define a feed nip to continue to move the sheet forwardly through the adhesive applying station 38.

To drive the drum 102, the underlying pressure roller 124 and the glue rollers 104, 108 and 114 in timed relationship to one another, a large timing gear is fixed to the end of the drum support shaft 126 and meshed with gears fixed to the pressure applying roller support shaft 128 and the adhesive applicator roller support shaft 116. A gear fixed to the pickup roller shaft 118 is meshed with the gear fixed to the applicator roller shaft 116 and is driven thereby. The opposite end of the pickup roller shaft 118 also has a gear affixed thereto which drives a gear fixed to the metering roller support shaft 120. Thus, all of the adhesive rollers and the underlying pressure roller are driven by and in timed relationship to the drum gear. The power drive for the drum 102 and all of the moving apparatus comes from a motor 130 which drives a chain 132 driving a large gear mechanism 134 which in turn drives a chain leading a gear mounted on the opposite side of the drum 102 from the side shown in FIG. 3.

From the adhesive applying station 38, the second conveyor means 40, which is generally similar to the first conveyor means 36, feeds the cards bearing adhesive spots thereon to the swatch forming and applying station 42. More specifically, as shown in FIGS. 3 and 4, the second conveyor means 40 includes a pair of upstanding feed fingers 136 attached to a pair of endless bands in the form of chains 138, each spanning sprockets 140 and 142 fixed to rearward and forward horizontally disposed shafts 144 and 146.

Figure 4:
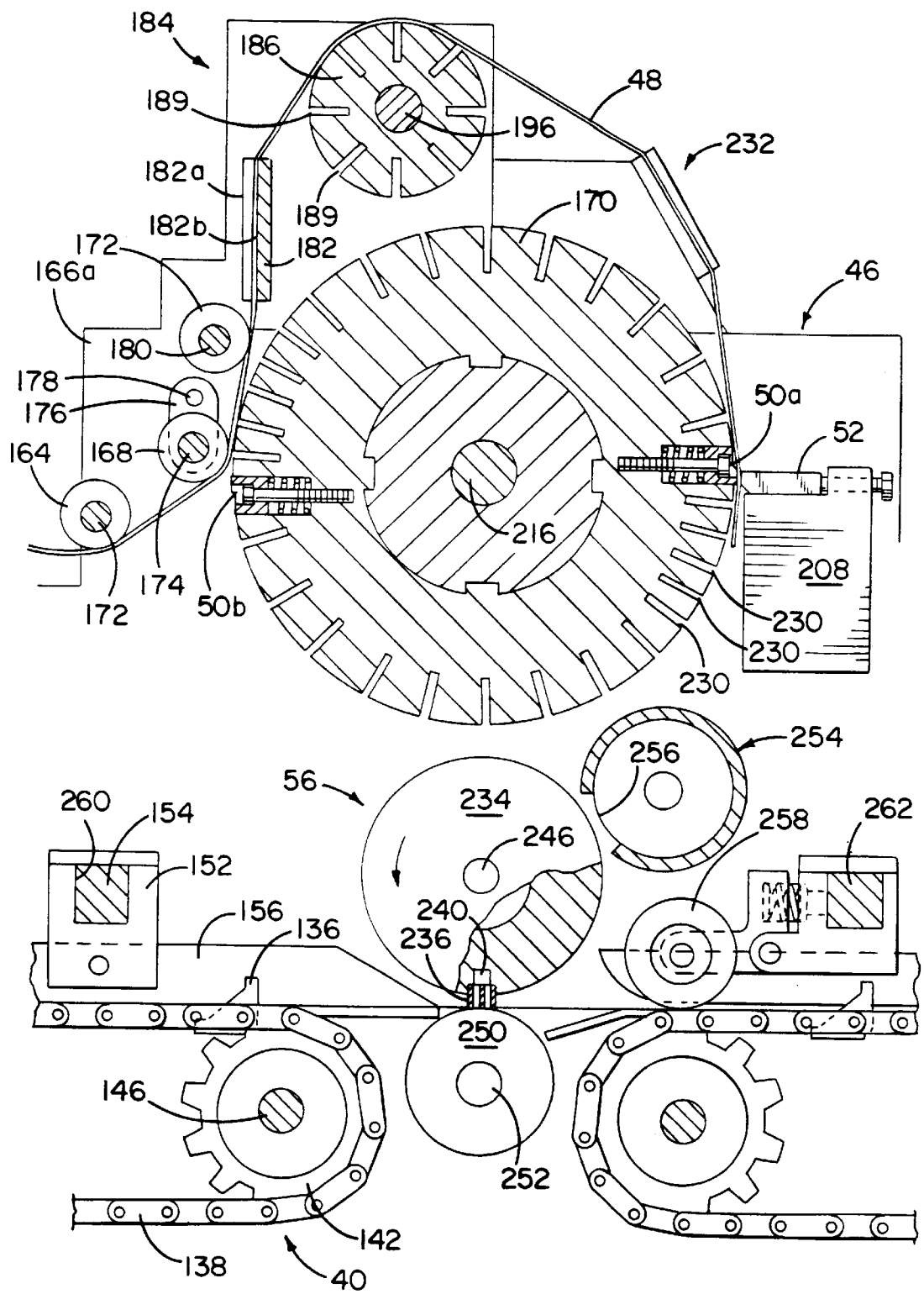
FIG. 4 is a partial cross-sectional view of the ribbon cutting and the swatch applying stations.

Side edge guides 148 and a plurality of hold down guide bars 150a–150c (as shown in FIGS. 4 and 15) extend between the adhesive applying station 38 and the swatch forming and applying station 42 to maintain the parallelism of the sheet 20 as it transfers to the latter. The hold down guide bars 150, which are similar to the hold down guide bars 94a–94c for the first conveyor means 36, are mounted by hanger brackets 152 slidable along transversely extending square bars 154 which pass through hollow square-shaped apertures 260 in the brackets 152. The hanger bars 154 span and are fastened to the upstanding side frames of the frame means 74. The sheet 20 slides along bottom plates 156 to and beneath the swatch transfer means 56 which transfers the severed swatches to the adhesive areas on the upwardly facing side of the sheet 20.

At the time the sheet 20 is moving into position to receive a row of swatches, predetermined lengths of color ribbons are unwound from the ribbon supply means 44 and fed forwardly to the severing means 46 where an entire row of swatches is severed simultaneously and then transferred from a severing means drum 170 by the swatch transfer means 56 to the moving sheet 20.

As best seen in FIG. 3, a plurality of reels 158 are mounted to turn loosely on a horizontally disposed support spindle 160 having narrowed ends received in upwardly opened slots carried by a support bracket means of the stationary frame means 74. The reels 158 are separated by spacers 162 along the spindle 160 to conform to the transverse spaces between the individual swatches on the sheet 20. From each of the reels, each web 48a–48f is fed forwardly to the underside of a rotatable, free wheeling roller 164 (also seen in FIG. 4) journaled to rotate about a shaft 172 journaled in upstanding side frame plates 166a–166b and then under a rotatably mounted and pivoted dancer or tension roller 168. The tension roller 168 rotates about a central shaft 174 fixed at its opposite ends to a pair of depending arms 176 which are pivotally mounted at their upper ends to pins 178 fixed to side plates 166a–166b. The tension roller 168 applies tension to the ribbons 48 until a cam pad on the severing means drum 170 rotates to abut the tension roller and pivot it upwardly in a clockwise direction allowing the color webs 86a–86f to go slack momentarily.

From the tension roller 168, the ribbons 48 travel past another guide roller 172 rotatably mounted on a stationary shaft 180 fixed to the opposite side plates 166a–166b and then past a vertical surface on a vertically extending side edge, guide plate 182 spanning the side plates to reach a vacuum feed roll means 184 which exerts a pressure on the ribbons to unwind the same from their respective reels 158a–158f. The guide plate 182 has a plurality of slots therein defined by a pair of parallel side walls 182a and a bottom wall 182b therebetween and this plate's construction is similar to guide plate 232, described in greater detail hereinafter.

Figure 10:
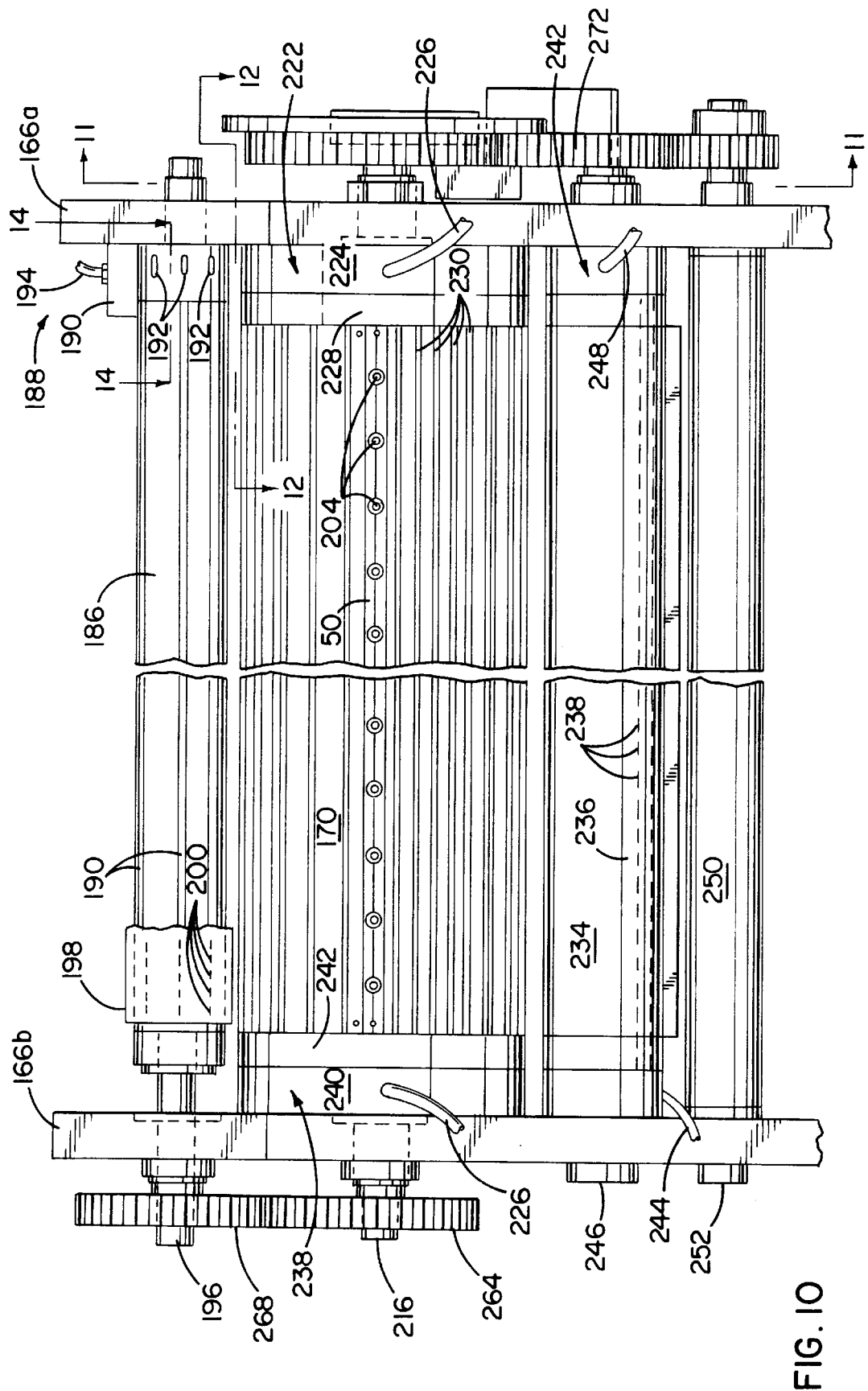
FIG. 10 is a view taken substantially along the line 10—10 of FIG. 6 and showing the rotating cutting blade cylinder.

The vacuum feed means 184 selectively applies suction to its rotatable suction feed roller 186 to unwind predetermined lengths of swatch material from the reels 158a–158f for each rotation of the severing means cylinder 170. To this end, the vacuum feed roller 186 is provided with an air valve means 188 (seen in FIG. 3) which cooperates with a plurality of longitudinally extending slots 189 which extend the length of the roller 186 and are spaced circumferentially about the roller 186. As shown in FIGS. 3 and 10, the vacuum valve means 188 includes a suction manifold 190 connected to the top of one end of the vacuum roller 186 and communicates with certain ones of a series of circumferentially spaced ports 192 on the end of the roller 186 as each port is turned into alignment with the manifold 190 which is connected to a suction pipe 194.

More specifically, the vacuum feed roller 186 is mounted on a continuously turning shaft 196 which turns each of the ports 192 to a position beneath the manifold 190, which has an internal arcuate groove [no view] overlying several of the ports 192, allowing the vacuum to be applied to several of the slots 192 simultaneously. Suitable plugs or pieces of tape are selectively applied to cover those ports which are not desired to cause any ribbon feeding. The ribbons or webs 48 are fed with their colored sides facing outwardly of the surfaces of the feed roller 186 and the rotary severing drum 170 so as not to be scratched thereby.

To allow for an easy change of spacing of the number or width of the swatch material webs 48, the outer surface of the vacuum feed roller 186 comprises a removable and replaceable sheet 198 (best seen in FIG. 10), such as a plastic mylar sheet, having circumferentially extending rows of pinholes 200 therein aligned with each of the ribbons. The pinholes 200 are also aligned over longitudinal slots 190 in the roller 186 to allow negative suction pressure to act to grip the ribbons 48 when suction is being applied to an underlying slot 190 through the control of the valve means 188. By the appropriate valve selection, the webs 48a–48f thus are fed and pulled and unwound from the reels 158a–158f in timed relationship to the severing means operation as will be described below.

In order to maintain parallelism and form rectangularly shaped swatches, the individual webs 48 are preferably guided between the vacuum feed roller 186 and the severing means 46 by a side edge guide means 232 herein in the form of a horizontally extending bar having grooves therein to define parallel side walls and a bottom wall for engaging each of the ribbons. Herein, the side edge guide means 232 is fastened at its opposite ends to the upstanding frame plates 166. The side walls of the edge guide means 232 may be adjustable in order to accommodate different widths of ribbons 48.

The severing means 46, shown in FIGS. 4–8, preferably comprises a stationary or anvil cutting blade 52 which cooperates with a moving cutting blade 50 which is flexibly mounted on a rotatable drum or cylinder 170 to sever swatches 24 of predetermined length from prepositioned color ribbons 48. The present severing means 46 contacts and cuts through all the ribbons 48a–48f simultaneously across the surface of the severing cylinder 170, thereby eliminating the problems experienced with the prior commercial process wherein a tapered blade cut sequentially across the drum, resulting in unequal sized swatches due to the drum's rotation when the sheet 20 was greater than eighteen inches in length.

The rotating severing blade 50, best seen in FIGS. 4–5, is preferably in the form of a bar 199 backed by a resilient means preferably in the form of springs 202 which are secured to the rotatable drum 170 with suitable threaded fasteners 204. Both the blade and the springs being mounted in a channel or slot 206 cut from end to end across the outer surface of the drum 170. The springs 202 are compressed between a rear or inner surface 50a of the bar and a bottom wall 206a of the slot 206. The amount of compression of the springs and the position of cutting edge 201 of the blade 50 are determined by the position of the fastener head 205 which is threaded into the cylinder at its inner end. Undersides 205a of the fastener heads abut inner wall 207a of fastener-receiving sockets 207 which are formed in the bar 199. By turning the fasteners the radial extension of the cutting blade bar and of the cutting edge 201 may be adjusted across the length of the cylinder. The bar 199 has opposite, radially-extending sidewalls 199a in sliding engagement with sidewalls 206a of the slot 206a.

As best seen in FIGS. 5–7 during the cutting operation, the cutting bar slides radially inwardly along the slot sidewalls 199a to further compress the springs 202 and to form a space or gap 220 (FIG. 6) between the undersides 205a of the fastener heads and the bottom wall 207a of the sockets 207 in the cutting bar. The anvil blade 52 pushes the rotating cutting blade inwardly from the position of FIG. 5 to the position of FIG. 6 as cutting edge 201 thereon engages and slides along a vertical wall 52a of the anvil blade to form the gap 220. When the cutting blade edge rotates below the anvil vertical wall, the springs push the anvil bar radially outwardly to the position of FIG. 7 where the gap 220 has been eliminated. The shank of the fasteners 204 is unthreaded near the head so as to allow movement of the blade 50 along the shank when the blade is shifted radially inwardly during the cutting operation. The plurality of fasteners 204 spaced along the length of the blade 50 ensures uniform loading along the blade 50 while at the same time the springs 202 minimize blade bowing or deflection.

The stationary or anvil cutting blade 52, shown in FIGS. 4–9, preferably comprises a stationary blade 52 mounted horizontally and parallel to the rotating severing cylinder 170, supported on its underside by an elongated heavy bar 208 extending between the side frames 166. The blade 52 is secured to the bar 208 by a plurality of fasteners 210 threaded downwardly through slots 214 in the blade 52 into the bar 208. A plurality of adjusting screws 212 are threaded horizontally through the bar 208 and have ends 211 abutting the vertical surface of the blade 52 opposite its cutting edge surface 52a. Turning of the adjusting screws allows close control of the spacing between the cutting edges of the stationary 52 and moving cutting blades 50 as well as control of the parallelism of the cutting edges by a shifting of the anvil blade in the slots 214 along the top of the bar 208.

The severing means drum 170, shown in FIGS. 3, 4 and 10, is supported and rotated by a horizontally extending shaft 216 journaled for rotation in upstanding frame plates 166 and located above the second conveyor means 40. The drum 170 is also a vacuum drum means for carrying predetermined lengths of the color ribbons through the severing means 46. The ends of the ribbons 48 extending upwardly of the anvil blade 52 slide over the rotating drum 170 surface (as in FIG. 7) until a vacuum control valve means 222 allows suction pressure to hold the ribbons 48 to the drum 170 and feed the ribbons downwardly a short distance past the stationary anvil blade 52 into the spacing 218 (best shown in FIG. 7) between the drum 170 and the stationary blade 52. Herein, the painted sides of the swatches face outwardly of the drum 170 and hence will not be scratched by relative sliding between the webs and the drum surface.

The capacity of the apparatus can be increased by adding a second moving cutting blade 50b to the rotating severing drum 170, preferably located 180° apart from the first moving cutting blade 50a on the drum circumference, as best seen in FIG. 4. Each of the two moving cutting blades 50a–50b can sever a row of swatches 24 within one rotation of the severing cylinder 170, thereby allowing base sheets 20 with a dimension in the direction of sheet travel equal to or less than one-half of the severing means cylinder circumference to be fed into the apparatus in close sequence. Where the base sheets 20 are longer than this, the vacuum drum means of the severing drum 170 can be blocked in the proximity of the second moving blade 50b such that no ribbon 48 is pulled between the drum 170 and stationary blade 52 for that portion of the drum's rotation, thereby allowing the second moving cutting blade 50b to rotate past the stationary knife 52 without severing any ribbon 48.

The vacuum valve means 222 (shown in FIG. 10) of the severing drum 170 comprises a stationary valve disk 224 which is connected to a suction hose 226. The suction hose 226 is connected through a port in the stationary disk 224 to a rotating valve disk 228 which is connected to longitudinally extending grooves 230 in the severing drum 170 as well as affixed to the end of the drum to rotate therewith. To provide versatility in formation of various widths and spacings between swatches 24 as well as to provide a quick change to accommodate swatches of various sizes and shapes, it is preferred that suction be applied from the grooves 230 through a removable and replaceable sheet of a material such as plastic or mylar having pinholes being aligned with the drum grooves 230. Thus, the location of the suction in the transverse direction across the drum 170 is determined by the locations or holes formed in the sheet.

The severed swatches 24 are carried downwardly from the severing means 46 towards the underlying swatch transfer means 56 by being held by the suction pressure until the swatches 24 reach the underlying transfer drum 234 at which time it is preferred to assist the transfer by means of a positive pressure or blowout being applied over a positive pressure line 236 to a positive pressure valve means 238. The positive pressure valve means 238 comprises a stationary valve disk 240 secured to the frame side plate 166 at the opposite end of the severing drum 170 from the vacuum valve means 222 as well as connected to the positive pressure hose 236 by a port in the disk 240. A rotating valve disk 242 fastened to that same end of the severing drum 170 and mounted in parallel to the stationary valve disk 240 admits positive air pressure into grooves 230 in the severing drum 170 as the drum and disk 242 rotate. Apertures in the rotating valve disk 242 align with the port in the stationary disk 240 during portions of the rotation, thereby breaking the vacuum previously existing and causing air to flow from the positive pressure hose 236 through the port and disks 240 and 242 to the drum grooves 230 to provide a positive blowout pressure which causes the swatches 24 to transfer from the severing drum 170 to the transfer drum 234.

In a like manner, the transfer drum 234 retains the swatches thereon by a vacuum and rotates the swatches downwardly to the underlying base sheet 20 at which time a positive air pressure is similarly exerted to assist in transferring the swatches to adhesive spots on the underlying sheet. Herein, the transfer drum 234 transfers swatches 24 with each revolution thereof and has a single ported vacuum bar means on its periphery. The transfer drum 234 functions to place the unpainted side of the swatches 24 against the adhesive spots, it being recalled that the painted sides of swatches previously faced outwardly of the severing drum 170 surface. During the transfer operation at the nip between the drums 234 and 170, the painted sides of the swatches 24 become oriented against the transfer drum's surface with their unpainted sides facing outwardly for moving into contact with the underlying sheet 20.

The vacuum bar means of the transfer drum 234 is preferably in the form of an apertured bar 236 which extends longitudinally of the drum 234 and projects outwardly of the drum surface by a predetermined distance such that the drum surface will not contact the adhesive spots on the underlying sheets 20 passing beneath the transfer drum 234. The apertured bar 236 is seated in a slot machined into the transfer drum 234 surface and secured thereto by suitable fasteners. Preferably, the bar 236 has two rows of generally radially directed apertures 238 (FIG. 10) therein with adjacent apertures closely spaced in rows extending longitudinally along the drum 234.

Herein, each of the apertures 238 is in fluid communication with another narrow slot 24.0 located behind the bar 236 and extending longitudinally the length of the bar to an air valve means 242 located at the right side of the transfer drum 234. Thus, negative air pressure from the air valve means 242 draws air through the apertures 238 and the narrow slot 240 and exerts a suction force on the swatches 24 on the bar 236 surface as the swatches are carried downwardly for application to the underlying sheet 20. Those apertures 238 in each row which are not in alignment to receive a swatch 24 may be selectively masked such that negative as well as positive air pressure is communicated only through unmasked holes. It is an easy matter to mask or unmask the apertures 238 when one changes the widths or spacings of the swatches 24.

The swatch transfer drum 234 is mounted for counter-clockwise rotation by a shaft 246 extending axially from the end walls of the drum and journaled for rotation in the upstanding frame plates 166. Suction is applied to the transfer drum 234 through a suction hose 248 leading to the valve means 242 for approximately 180° of the downward rotation of the transfer drum bar 236. The swatches 24 are carried downwardly to the underlying sheet 20 and then transferred, preferably by the aid of positive pressure through the air valve means 242. A positive air pressure pipe 244 connected to the other end of the air valve means 242 and through it to the apertured bar 236 discharges a positive air pressure flow when the swatch transfer drum 234 passes through the bottom of its rotation.

As described earlier, the severing drum 170 may be provided with two diametrically opposing moving cutting blades 50a and 50b in order to increase output of the apparatus. Where it is necessary due to base sheet 20 size to operate a dual-blade apparatus in a single-blade mode, it is desirable to disable the vacuum in the swatch transfer drum 234 for those alternate rotations where there will be no swatches 24 to transfer. A vacuum saver means 274 connected to the axial ends of the severing drum 170 and the transfer drum 234 can enable and disable the vacuum in the transfer drum to conserve energy.

Figure 11:
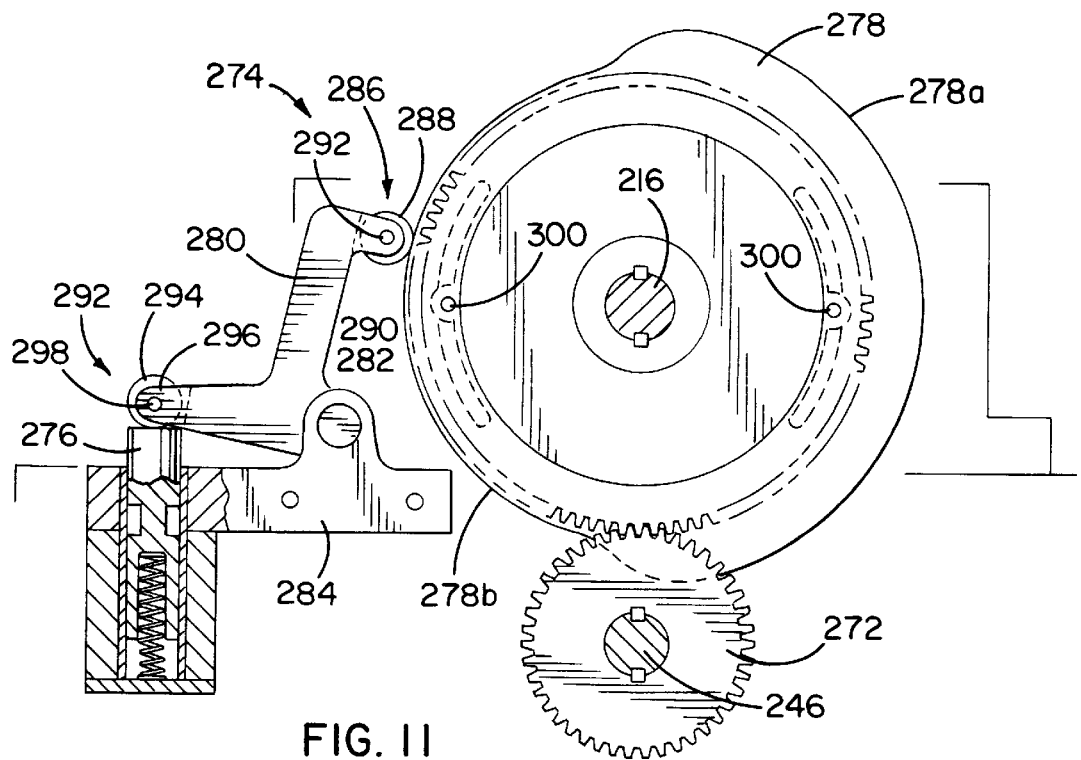
FIG. 11 is a view of the vacuum saving system for use with the cutting blades.
Figure 12:
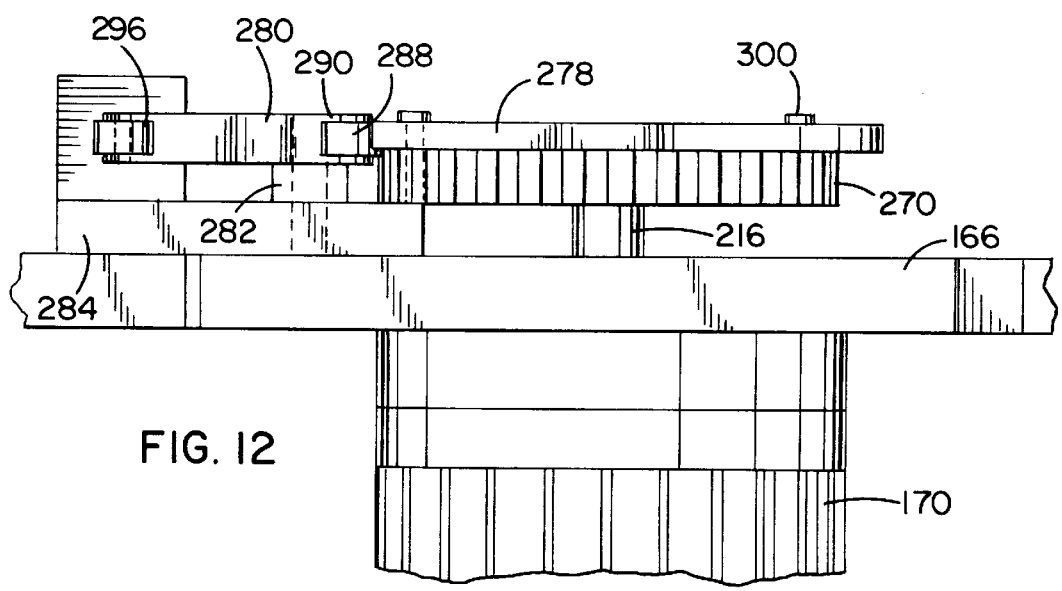
FIG. 12 is a plan view of a portion of the vacuum saving system of FIG. 11.

The vacuum saver means 274 is preferably comprised of a valve 276 controlled by a cam follower 280 in contact with a cam 278 which is connected to an end of the severing drum 170 such that the valve 276 is turned on and off by rotations of the severing drum 170. Herein, as shown in FIGS. 11 and 12, the cam 278 is mounted in parallel to the axial end of the severing drum 170 and secured to the gear 270 attached to the drum 170 so as to rotate with the drum 170. The cam 278 is preferably shaped with about a 180° high lobe 278a and a dwell portion 278b. The cam 278 is secured to the gear 270 with suitable fasteners 300 so as to allow either of the two moving cutting blades 50a–50b to be disabled and also to allow quick removal of the cam 278 where both moving blades will be operated.

Herein, the cam follower 280 is in the form of a bell crank pivotally mounted with a pin 282 to a bracket 284. The cam follower 280 is located within the same plane as the cam 278 and parallel to same end of the severing drum 170. The cam follower 280 provides a cam contact end 286 comprised of a roller 288 rotationally mounted in the spacing between parallel walls 290 with a pin or shaft 292. This roller 288 is in contact with the outer circumference of the cam 278 as it rotates with the severing drum 170. The other end of the cam follower 280 is a valve contact end 292 similarly comprised of a roller 294 rotationally mounted between parallel walls 296 with a pin or shaft 298. The valve contact end 292 of the cam follower 280 is in contact with the valve 276 and moves the valve between on and off positions as the cam follower 280 is pivoted with the rotation of the severing drum 170.

As shown in FIGS. 11 and 12, the vacuum saver valve 276 is either depressed or released with the rotation of the severing drum 170, controlling the suction provided to the swatch transfer drum 234. The cam contact end 286 of the cam follower 280 tracks the outer circumference of the cam 178 as the cam and the severing drum 170 rotate, pivoting the cam follower 280 backwardly and depressing the valve 276 for the larger circumference portion and releasing the valve 276 for the smaller circumference portion of the cam 278. The valve 276 is connected by suitable hoses (not shown) to the valve means 242 of the swatch transfer drum 234, thereby disabling the vacuum in the drum 234 for the half of the rotation of the severing drum 170 where the unused moving cutting blade 50 is located.

As shown in FIG. 10, to maintain the proper timing of the vacuum feed roller 186 and the severing drum 170, a gear drive is connected to the respective ends of the drive shafts for these drums. More specifically, the shaft 216 for the severing drum 170 has a gear 264 meshed with a gear 268 carried on the shaft 196 of the feed roller 186, thereby turning the vacuum feed roller in timed relationship to the severing drum 170. Similarly, to maintain the timing between the severing drum 170 and the transfer roller 234, a gear 270 on the other end of the severing drum shaft 216 is meshed with a gear 272 on the shaft of the transfer roller 246.

Preferably, a backup rotating roller 250 axially mounted between the side frames 166 by means of a rotatable shaft 252 to form a nip with the transfer roller 234 to force the swatches 24 into sufficiently tight engagement with the sheet 20 that they will remain adhered thereto as the sheet transfers to succeeding swatch forming and applying stations 42 linked downstream. It is also preferred to provide a scrap collecting hollow sleeve 254 closely adjacent the surface of the transfer roller 234 to remove any scraps or other material which tends to accumulate on the transfer drum. Herein, the sleeve 254 is secured to opposite side frame walls 166 and has an arcuate opening in its circumference 256 through which scrap may pass to the interior of the sleeve 254.

To assure continuous movement and travelling of each sheet 20 between each successive station 42, several rotating upper pressure wheels 258, of the type shown in FIG. 4, pull the sheets 20 forwardly for feeding to the next linked swatch forming and applying station 42. The feed wheels 258 are slidably mounted on a horizontally disposed support shaft 262 to allow the wheels to be shifted to locations so as not to engage and smear any adhesive on the sheet passing therebeneath.

From the foregoing, it will be seen that much faster production may be achieved by orienting sheets of greater than 18 inches in length with their long dimension extending transversely to the sheet feed direction. The swatches are severed over this long length of eighteen inches or greater by a spring biased, rotatable cutting blade that shifts radially inwardly during the cutting of the ribbons to form the swatches. Because all of the ribbons are cut substantially simultaneously rather than in a spiral manner, as is conventional, all of the swatches in a row will be uniform rectangles, as shown in FIG. 13, and uniform in length rather than parallelograms with canted edges (FIG. 14) and of increasing length across the long axis of card.

What is claimed is:

1. A method of manufacturing swatch bearing sheets each bearing rows of rectangular-shaped swatches adhered to the sheets at predetermined locations thereon, said method comprising the steps of:

providing at least one base sheet having a long axis dimension greater than eighteen inches in length;

continuously feeding a succession of base sheets forwardly to an adhesive-applying station;

applying adhesive to each base sheet via an adhesive applicator roller to predetermined adhesive locations;

transferring the base sheets to a first swatch forming and applying station while holding down the center portions of the sheets to avoid sheet bowing or buckling;

feeding a row of colored ribbons extending at least eighteen inches across to the swatch forming station;

severing the row of ribbons simultaneously at the swatch forming and applying station with the cutting blade on a rotatable cylinder having a straight cutting edge parallel to an axis of rotation of the cylinder to form a row of swatches with each swatch of equal length and with each swatch in the shape of rectangles;

applying a first row of rectangular swatches across at least an eighteen inch length to each continuously moving sheet by a rotating swatch transfer means and applying a swatch row that is greater in number than the number of swatch forming and applying stations;

continuously feeding each of said sheets through a predetermined number of additional linked swatch forming and applying stations;

cutting a plurality of ribbons simultaneously with a cutting blade having a straight cutting edge parallel to the axis of rotation of the cylinder and resiliently mounted on the cylinder to cut rectangular swatches and to form the row of swatches;

applying a second row and additional rows of rectangular swatches to each continuously moving sheet by rotating swatch transfer means in each of the predetermined number of linked swatch forming and applying stations of a lesser number than of said rectangular swatches in a row as the sheet travels through said additional stations to form a plurality of rows of rectangular swatches on said sheets with the number of rows formed corresponding to the predetermined number of swatch forming and applying stations.

2. A method of manufacture in accordance with claim 1 wherein the step of continuously feeding a succession of base sheets includes providing sheet feeding means for feeding base sheets in a forward direction to the adhesive applying station, and the method further includes the step of feeding two base sheets simultaneously into the sheet feeding means side-by-side to receive ribbon swatches extending at least eighteen inches cumulatively, where the dimension of the sheet along the axis normal to the forward feed direction is less than one-half of the total width of the feeding means.

3. A method of manufacture in accordance with claim 1 wherein the feeding step includes the step of providing sheet feeding means for feeding base sheets in a forward direction with the sheet feeding means having a dimension aligned with the forward direction to accept base sheets having a maximum dimension oriented in the forward direction corresponding to the sheet feeding means forward direction dimension, and the cutting step includes the step of providing a severing means cylinder mounting a pair of cutting blades for severing ribbons upon rotation of the cylinder, and the method includes the further step of feeding two base sheets into the sheet feeding means end-to-end with the two base sheets having their forward direction dimension being less than one-half the sheet feeding means forward direction dimension and less than one-half of the circumference of the severing means cylinder.

4. A method of manufacture in accordance with claim 1 wherein the step of cutting of the ribbons includes:

rotating a cutting blade which is flexibly mounted on a severing means cylinder, partially retracting the cutting blade upon striking an anvil blade after contacting the continuous ribbons, thereby cutting simultaneously through all the ribbons aligned across the severing means to form the rectangular swatches.

5. A method of manufacture in accordance with claim 1 including the further step of:

rotating a cylinder with two moving cutting blades mounted 180° apart such that both blades sever successive rows of swatches during each rotation of the cylinder.

6. An apparatus for manufacturing swatch bearing sheets each bearing rows of rectangular-shaped swatches adhered to the sheet at predetermined locations thereon, said apparatus comprising:

a plurality of swatch forming and applying stations aligned along a travel path for the swatch bearing sheets;

means for continuously feeding a succession of base sheets having a long axis dimension greater than eighteen inches in length where that long axis is normal to the direction of sheet travel through a plurality of swatch forming stations;

means for transferring the base sheets to an adhesive applying station;

means for transferring the base sheets to an between the plurality of swatch forming and applying stations; a predetermined number of ribbon supply means at each of swatch forming station for supplying a number of ribbons greater than the number of swatch forming stations;

means for simultaneously severing swatches of equal length in each row at each of the swatch forming stations from the continuous color ribbons supplied from the ribbon supply means and aligned across the severing means, with the number of severed swatches in the row greater than the total number of swatch forming stations; and the means for simultaneously severing rectangularly-shaped swatches in each row comprising a rotating cutting cylinder rotatable about a rotational axis;

a cutting blade having a straight cutting edge parallel to the rotational axis of the cutting cylinder to engage all of the ribbons simultaneously;

a flexible mounting on the cylinder mounting the straight cutting edge to allow the straight cutting edge to partially retract as it severs the rectangularly-shaped swatches from all of the ribbons at the swatch forming station, means at each of the swatch forming stations for transferring the severed swatches to rows of adhesive locations across the long axis of the base sheet.

7. An apparatus in accordance with claim 6 in which there are two cutting blades mounted 180° apart on the severing means cylinder such that swatches can be severed every one-half rotation of the cylinder when base sheets are fed end-to-end thereby doubling the output of the severing means.

8. An apparatus for manufacturing swatch bearing sheets each bearing rows of swatches adhered to the sheet at predetermined locations thereon said apparatus comprising:

a plurality of swatch forming and applying stations aligned along a travel path for the swatch bearing sheets;

means for continuously feeding a succession of base sheets having a long axis dimension greater than eighteen inches in length where that lone axis is normal to the direction of sheet travel through a plurality of swatch forming stations;

means for transferring the base sheets to an adhesive applying station;

means for applying adhesive to each base sheet in predetermined locations across the lone axis of the base sheet;

means for transferring the base sheets to and between the plurality of swatch forming and applying stations;

a predetermined number of ribbon supply means at each of swatch forming station for susplying a number of ribbons greater than the number of swatch forming stations;

means for simultaneously severing swatches of equal length in each row at each of the swatch forming stations from the continuous color ribbons supplied from the ribbon supply means and aligned across the severing means, with the number of severed swatches in the row greater than the total number of swatch forming stations;

means at each of the swatch forming stations for transferring the severed swatches to rows of adhesive locations across the long axis of the base sheet, the severing means comprising a rotating cylinder and a cutting blade which is flexibly mounted on the rotating cylinder, and means mounting the cutting blade to allow it to partially retract as it contacts all the ribbons across the cylinder simultaneously to cleanly sever swatches from all the ribbons, and there being two cutting blades mounted 180° apart on the severing means cylinder such that swatches can be severed every one-half rotation of the cylinder when base sheets are fed end-to-end thereby doubling the output of the severing means, wherein the swatch transferring means includes a vacuum means on the severing means cylinder for holding the swatches onto the severing means cylinder for turning therewith, and a vacuum saving device which can be activated when the severing means is operating in single-knife mode, such that the vacuum is conserved during that portion of the rotation of the swatch transferring means where there are no severed swatches to transfer to the base sheet.

9. An apparatus in accordance with claim 6 in which the sheet transfer means includes sheet hold-downs to prevent bowing or buckling of center portions of the base sheets as they travel between the stations of the apparatus.

* * * * *